United States Patent
Emilsson et al.

(10) Patent No.: US 6,498,788 B1
(45) Date of Patent: Dec. 24, 2002

(54) METHOD AND A RADIO TERMINAL FOR INTERACTION WITH A SERVICE PROVIDER

(75) Inventors: Stellan Emilsson, Karlstad (SE); Mikael Schmitt, Karlstad (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/147,433

(22) PCT Filed: May 27, 1997

(86) PCT No.: PCT/SE97/00871

§ 371 (c)(1),
(2), (4) Date: Feb. 12, 1999

(87) PCT Pub. No.: WO97/50263

PCT Pub. Date: Dec. 31, 1997

(30) Foreign Application Priority Data

Jun. 26, 1996 (SE) .............................................. 9602527

(51) Int. Cl.$^7$ ................................................ H04B 1/69
(52) U.S. Cl. ........................ 370/342; 370/235; 370/468; 455/450
(58) Field of Search ................................. 370/465, 466, 370/338, 230, 231, 235, 468, 395.21, 493, 494, 495, 342, 479, 441; 375/222; 455/426, 552, 553, 557, 452, 450

(56) References Cited

U.S. PATENT DOCUMENTS

| | | | |
|---|---|---|---|
| 5,408,465 A | | 4/1995 | Gusella et al. |
| 5,442,625 A | * | 8/1995 | Gitlin et al. ................... 370/18 |
| 5,461,611 A | | 10/1995 | Drake, Jr. et al. |
| 5,497,373 A | * | 3/1996 | Hulen et al. ................... 370/79 |
| 5,497,504 A | | 3/1996 | Acampora et al. |
| 5,585,850 A | * | 12/1996 | Schwaller ................... 348/388 |
| 5,636,211 A | * | 6/1997 | Newlin et al. ............... 370/465 |
| 5,920,552 A | * | 7/1999 | Allpress et al. ............. 370/355 |

* cited by examiner

Primary Examiner—Steven Nguyen
Assistant Examiner—Duc Duong
(74) Attorney, Agent, or Firm—Oblon, Spivak, McClelland, Maier & Neustadt, P.C.

(57) ABSTRACT

A mobile radio terminal for a digital cellular radio communication system. The system includes a number of base stations connected to a public network. Each of the base stations is adapted to serve a number of mobile radio terminals. The mobile radio terminal includes negotiation means for initial negotiation with the service provider for the provision of a service application required by terminal user. A control means dynamically controls individual elements of the service application, interconnections between individual elements and interconnection between the service application and a carrier network. A co-division access device enables different users to share radio resource. The Co-division access device may use CDMA or COFDM.

38 Claims, 1 Drawing Sheet

METHOD AND A RADIO TERMINAL FOR INTERACTION WITH A SERVICE PROVIDER

BACKGROUND OF THE INVENTION

1. Field of the Invention

The invention relates to a mobile radio terminal for a digital cellular radio communication system, which makes efficient use of a radio resource, a method for the efficient use of bandwidth for mobile radio services, particularly, multimedia radio services, and a digital cellular radio communication system including a number of said mobile radio terminals.

2. Discussion of the Background

Known digital cellular radio communication systems, such as, for example, GSM (Global System for Mobile Communication), or Digital Cellular System 1800 MHZ (DCS 1800), include a number of base stations, each serving a number of mobile radio terminals and being connected to a public telephone network, i.e. a fixed network, the functionality of each mobile radio terminal being determined by a software program located therein. The manner in which systems, such as GSM and DCS 1800, are generally operated and controlled, is well known to persons skilled in the art and will not, therefore, be dealt with in any great detail in this patent specification. The nature and scope of the present invention will be readily understood by persons skilled in the art from the following description of various aspects of the invention.

In practice, a multimedia service normally consists of a number of functions, for example, audio, data and video, and each of these functions can produce a varying flow of data and make different demands on a carrier service. If the carrier service uses a radio based access to a transport network, then a situation will arise where a multimedia service, with a strongly varying need for transmission capacity, will have to use a carrier service which cannot guarantee a required capacity and/or quality. In addition, the capacity and/or quality of the carrier service can also be subject to variation. Furthermore, the radio medium is a limited resource and it is, therefore, very important that this resource should be used in an efficient manner.

Thus, if a multimedia service cannot be editions on a radio medium, a mobile multimedia service will:

- be of poor quality because variations in the capacity and/or quality of the carrier network will result in strongly varying service quality; and
- consume an unreasonably large part of the radio resource, i.e. the number of users having simultaneous access will be extremely limited, and as a consequence of this, the service will become very expensive, thereby making it less attractive (i.e. uninteresting) to the great majority of users.

SUMMARY OF THE INVENTION

It is an object of the present invention to provide a mobile radio terminal which makes efficient use of a radio resource, thereby making a mobile service and, in particular, a mobile multimedia service, more attractive to users.

It is another object of the present invention to provide a method for the efficient use of bandwidth for mobile radio services, particularly, multimedia radio services.

It is another object of the present invention to provide a mobile radio communication system including a mobile radio terminal which makes efficient use of a radio resource.

The present invention provides a mobile radio terminal for a digital cellular radio communication system including a number of base stations connected to a public network, each of the base stations being adapted to serve a number of mobile radio terminals, characterized in that the mobile radio terminal includes:

- negotiation means for initial negotiation with a service provider for the provision of a service application required by a terminal user;
- control means for dynamically controlling:
  - individual elements of the service application;
  - interactions between said individual elements; and
  - interactions between the service application and a carrier network; and
- code division access means for enabling different users to share a radio resource.

The code division access means may use CDMA, or COFDM.

The mobile radio terminal may include a radio data modem for transmitting and receiving data for the service application, the data modem including an access function for controlling access to the carrier network and a mobile user terminal interactively connected to the data modem, the mobile user terminal including terminal user means adapted to enable a user to specify and control a required service application; in that the negotiation means are adapted to negotiate a service goal with the service provider which satisfies the user requirements; in that a service function of the mobile user terminal is adapted, on completion of the negotiation, to request the access function to establish a radio data channel connection to the service provider, which makes it possible to achieve the service goal; and in that the radio data modem is adapted, during provision of the required service, to dynamically coordinate and control the service application by ensuring that the radio data channel continues to make it possible to achieve the service goal.

The mobile radio terminal may include a radio data modem for transmitting and receiving information data, the data modem being adapted to utilize a radio resource to accommodate different service applications and including an access function for controlling access by the mobile radio terminal, to a carrier network, and a data flow control function for the data modem; and a mobile user terminal including a control function for specifying and controlling a service application required by a terminal user a service function for establishing the service application and negotiating a service goal, with a provider of the required service application, which satisfies the user requirements, in that the service function is adapted, on completion of the negotiation, to request the access function to establish a radio data channel connection to the service provider, which makes it possible to achieve the service goal; and in that the radio data modem is adapted, during provision of the required service, to dynamically coordinate and control the service application by ensuring that the radio data channel continues to make it possible to achieve the service goal.

The service goal may specify the type and quality of the service (QoS) available from a service provider, and the achievement of the service goal may be determined by the QoS provided by the established radio data channel. The QoS may be determined by demands imposed by the service application.

The service provider may include the service functions in a fixed network and/or the service functions belonging to another user of the digital cellular radio communication system.

In accordance with the invention, the data modem, in the event that the required QoS for achievement of the service goal cannot be met, is informed of the maximum QoS that can be offered, the mobile user terminal is informed by the data modem. of the offered QoS and, on receipt of the information concerning a restricted QoS, is adapted to optimize the service application on the basis of the offered QoS.

Also, in the event that the data modem receives information concerning an improved QoS, the mobile user terminal is informed of the improvement and, on receipt of the information concerning an improved QoS, optimizes the service application on the basis of the improvement.

The negotiation means may be adapted to renegotiate the service goal during provision of the service application and the renegotiation of the service goal may result in an extension of the service application.

In a preferred arrangement for the mobile radio terminal, the service application is a multimedia application and the individual elements of the multimedia application may be video, audio and data.

The individual elements of the service application may be allotted resource frames containing the maximum allowable bandwidth that may be used for a respective element of the service application, and how much bandwidth may be used, on average, by the element may be allotted resource frames containing, for each individual element of the service application, the maximum allowable bandwidth that may be used for a respective element of the service application, and how much bandwidth may be used, on average, by the respective element of the service application.

The resource frames may contain the quality requirements of respective elements of the service application and may be associated with a multimedia application.

The present invention also provides a method for the efficient use of bandwidth for mobile radio services provided by a digital cellular radio communication system including a number of mobile user terminals, each having a radio data modem for transmitting and receiving information data on a radio channel, and a number of base stations connected to a public network, each of the base stations being adapted to serve a number of mobile terminals, the method being characterized by the steps of:

a user of a mobile terminal specifying a required service application;

said mobile terminal initiating the establishment of a service application, on the basis of said user requirements, and negotiating a service goal, which satisfies said user requirements, with a provider of the required service application;

the mobile terminal, on completion of the service goal negotiation, establishing a radio data channel between a respective radio data modem and the service provider, which makes it possible to achieve the service goal, the radio modem being adapted to utilize the radio resource to accommodate different service applications; and the data modem, during provision of the required service, dynamically coordinating and controlling the service application by ensuring that the radio data channel continues to make it possible to achieve the service goal.

In accordance with the method, the service goal may specify the type and quality of the service available from a service provider, and the service provider may include the service functions in a fixed network and/or the service functions belonging to another user of the digital cellular radio communication system.

In accordance with the method, the service goal may be determined by the QoS provided by the established radio data channel, and the QoS may be determined by demands imposed by the service application.

The method may include the steps of:

in the event that the required QoS for achievement of the service goal cannot be met, said data modem is informed of the maximum QoS that has been offered;

said mobile terminal is informed by said data modem of the offered QoS; and the mobile terminal, on receipt of the information concerning a restricted QoS, is adapted to optimize the service application, on the basis of the offered QoS.

Optimization of the service application, on the basis of the offered QoS may, according to the invention, include the step of prioritizing individual elements of the service application, the prioritization resulting in a deterioration of the quality of at least one of the elements, and/or temporary deactivation of at least one other of the elements.

The method may include the steps of:

in the event that the data modem receives information concerning an improved QoS, said mobile terminal is informed of the improvement; and the mobile terminal, on receipt of the information concerning an improved QoS, optimizes the service application on the basis of the improvement.

Optimization of the service application, on the basis of the improved QoS may, according to the invention, include the step of prioritizing individual elements of the service application, the prioritization resulting in the quality of at least one of the elements being improved and/or activation of at least one other of the elements.

The method may include the step of renegotiating the service goal, during provision of the service application, and such renegotiation of the service goal may result in an extension of the service application.

In a preferred method, the service application is a multimedia application and the individual elements of the multimedia application include video, audio and data.

The method may include the steps of allotting resource frames to the individual elements of the service application, each resource frame containing the maximum allowable bandwidth that may be used for a respective element of the service application, and how much bandwidth may be used, on average, by said respective element of the service application.

The method may include the steps of allotting resource frames to the radio data modem, said resource frames containing, for each element of the service application, the maximum allowable bandwidth that may be used for the said element, and how much bandwidth may be used, on average, by the said element.

The resource frames may contain the quality requirements of respective elements of the service application and may be associated with a multimedia application.

The method may use code division access, for example, CDMA, or COFDM, to enable different users to share a radio resource.

The invention further provides a digital cellular radio communication system including a number of mobile radio terminals and a number of base stations connected to a public network, each of the base stations being adapted to serve a number of mobile radio terminals, characterized in that each of the mobile radio terminals are provided by a mobile radio terminal as outlined in preceding paragraphs.

The invention further provides a mobile radio terminal for a digital cellular radio communication system including a number of base stations connected to a public network, each of the base stations being adapted to serve a number of mobile radio terminals, characterized in that the mobile radio terminal is adapted to effect efficient use of a radio resource and includes a service function for optimizing a service application required by a terminal user on the basis of a service goal and existing bandwidth of a radio data channel; a radio data modem including an access function for dynamically controlling the radio data channel to provide a connection which makes it possible to achieve the service goal, and a data flow function for power control, channel encoding and code division of the radio data channel, the access function interacting with the service function; and resource management means for managing the interaction between the service and access functions.

The resource management means may include first management means for control of resources used by elements of the service application, the resources being associated with control of the data flow function of the radio data modem, and the service application, and in that the control is effected by a local application.

The resource management means may include second management means for control of said radio resource, said radio resource being associated with control of the data flow function of said radio data modem to enable momentary use, by said radio data modem, of the bandwidth needed on said radio data channel, and in that said control is effected by allocation of resource frames to said radio data modem.

BRIEF DESCRIPTION OF THE DRAWINGS

The foregoing and other features of the present invention will be better understood from the single FIGURE of the accompanying drawings which diagrammatically illustrates, in the form of a block diagram, a mobile multimedia radio terminal.

DETAILED DESCRIPTION OF THE PREFERRED EMBODIMENTS

Figure 1:
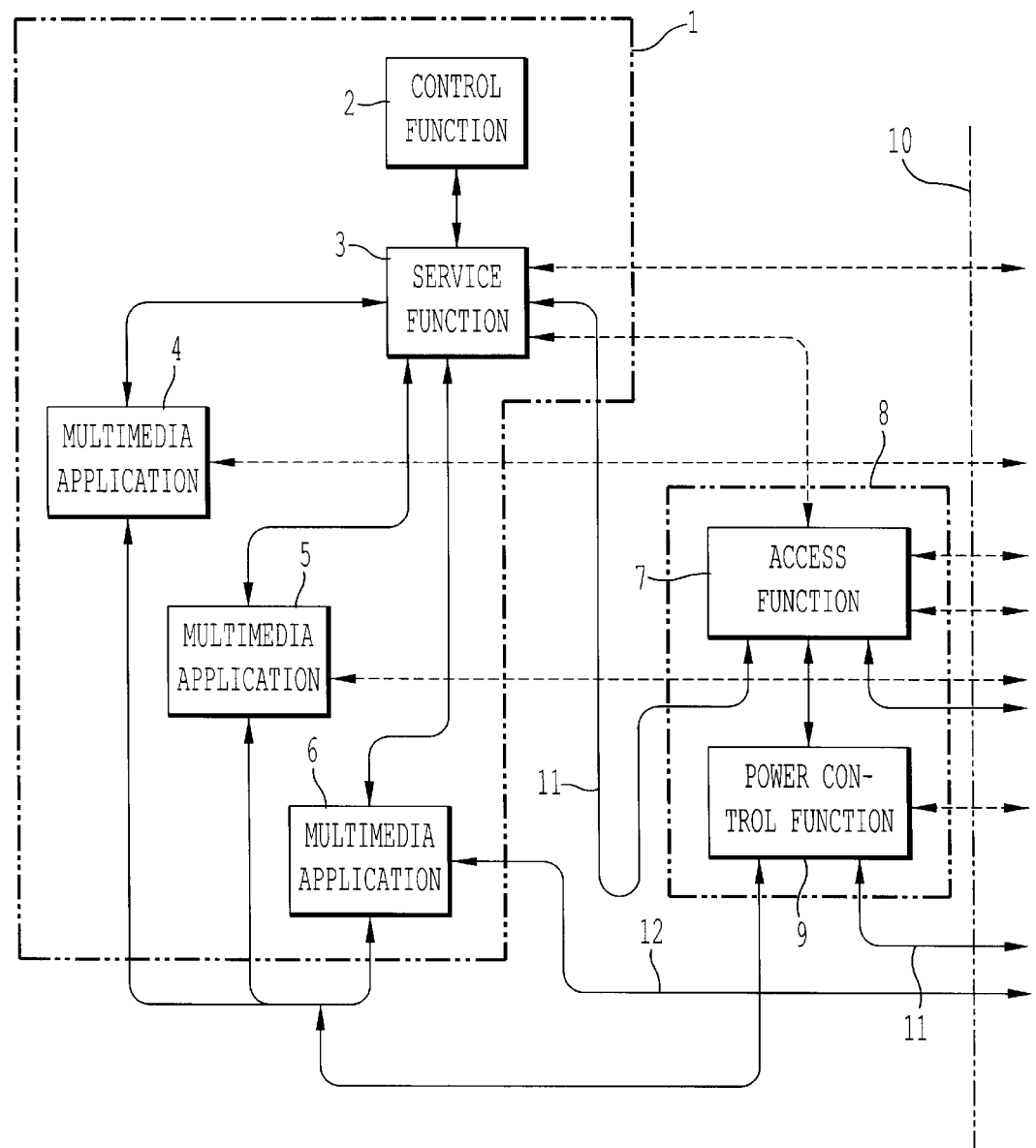

It will be seen from subsequent description of the present invention that, in order to achieve efficient use of a radio resource, it will be necessary to provide, inter alia:

an initial negotiation of service provision;

dynamic control of individual multimedia applications;

dynamic interaction between multimedia applications;

dynamic interaction between service and carrier network; and the correct type of access technology.

In the single FIGURE of the accompanying drawings, the physical connections are shown as full lines, a radio boundary is shown by the dotted line 10, and the other dotted lines are logical connections.

As can be seen from the single FIGURE of the accompanying drawings, a mobile multimedia radio terminal, according to the present invention, includes a mobile user terminal 1 and a radio modem 8.

The mobile user terminal 1 includes a control function 2, multimedia applications 4 to 6 and a service function 3. The radio modem 8 which is used to effect the transmission and receipt of information data on a radio channel, includes an access function 7 which is connected to, and interacts with, a function 9 for effecting power control, channel encoding and code division of a physical data channel 12.

It will be seen from subsequent description that, in essence, the present invention resides in the structure: the interaction between and the features of the functional units 2 to 7 and 9. Thus, the multimedia service provided by the mobile multimedia radio terminal, according to the present invention, may be divided into a number of component parts which are based on different functional concepts.

The control function 2, which is connected to, and interacts with, the service function 3, enables a user of the mobile terminal 1 to control a mobile multimedia service and obtain information concerning the behaviour of the service. In other words, the multimedia mobile terminal includes means for negotiating with a multimedia service provider for the provision of a multimedia service application required by a user of the terminal.

The service function 3 which, as shown in the single FIGURE of the accompanying drawings, is connected to, and interacts with, each of the multimedia applications 4 to 6, is adapted to provide a user of the mobile terminal 1 with as good a service as is possible, within the individual multimedia applications 4 to 6, and the interaction between the applications. The service function 3 is also linked to the access function 7 of the radio modem 8 via a control channel 11.

Thus, based on the requirements of a user, a multimedia service, with service functions belonging to an operator or other users is firstly negotiated by means of the service function 3 and the access function 7. On completion of the negotiation procedure, the multimedia applications 4 to 6 are dynamically coordinated and controlled, i.e. the quality of the multimedia applications are optimized, on the basis of possible limitations with respect to the connection reported by the access function 7.

The multimedia applications 4 to 6 which, respectively, relate to video, audio, and data applications, can, in accordance with the present invention, be controlled separately from the service function. The applications 4 to 6 are each connected to and interact with the function 9 of the radio modem 8 by means of the data channel 12. Any one or more of the multimedia applications can, in accordance with the present invention, be activated and deactivated either before, or during, service provision. Also, the quality level of the multimedia service can be set either before or during, service provision. This means that utilization of bandwidth, i.e. the generated bits/s, of the multimedia service can be controlled during the provision of the service.

The access function 7 controls the access of the mobile radio terminal 1 to an operator's carrier network. This includes, for instance, the logic for managing the signalling towards a fixed network which is needed to establish a connection and the control and supervision of the mobile terminal's bandwidth utilization and handover algorithms. The handover algorithms determine the base station to which the mobile radio terminal 1 should be connected, via the radio mobile 8, for the provision of the service function. The access function 7 has the task to continuously attempt to provide the service function 3 with a connection which makes it possible to achieve a desired service goal (i.e. interaction between the multimedia applications 4 to 6 and the carrier network is dynamically controlled).

A method, according to the present invention, for the establishment of a multimedia service, includes the following steps;

a user of the mobile radio terminal 1 firstly specifies a service requirement by means of the control function 2;

the service function 3 initiates the establishment of the service on the basis of the user's requirements and negotiates a service goal, i.e. the required quality and type(s) of multimedia application, for example, video, audio, data, or any combinations thereof—the other party to the negotiation comprises service functions in a fixed network belonging to an operator and/or a service function belonging to another user—the negotiated service goal will either satisfy the user's requirements or be a restricted service goal because the other use, for example, has introduced restrictions which maybe in a form of an impaired application quality;

on completion of the service goal negotiation, the service function 3 requests the access function 7 to establish a connect-on which will make it possible to achieve the negotiated service goal—this request is expressed in terms of QoS (Quality of Service), where there can be specific demands for different types of applications, for example, can different types of channel encoding be connected to different types of application data—in other words, the radio modem is adapted to utilize the radio resource to accommodate different types of applications.

The steps which are effected, in accordance with the method of the present invention, during the provision of a multimedia service, are as follows:

the access function 7 is adapted to continuously attempt to provide the service function 3 with a connection which makes it possible to achieve the service goal;

if it is not possible to provide such a connection for the service function 3, i.e. the required QoS cannot be obtained, the access function 7 is informed of the maximum QoS that has been offered;

if the service function 3 receives information concerning a restricted QoS, it is adapted, on the basis of this restriction, to optimize the multimedia service—in other words, the different applications 4 to 6 are prioritized by the service function 3 and this can result in deterioration of the quality of an application, and/or that certain applications are temporarily deactivated;

if the service function 3 receives information concerning an improved QoS, it is also adapted, on the basis of this information, to optimize the multimedia service—in other words, the service function 3 will prioritize the different applications 4 to 6 and this can result in the quality of an application being improved and/or that certain applications are activated; and during the provision of a multimedia service, it is possible for the service goal to be renegotiated, for example, if a user wishes to add a multimedia application.

In order to effectively control utilization of the applications resource, the applications 4 to 6 are allotted resource frames. The resource frames contain the maximum allowable bandwidth (expressed in bits/s) which may be used, and how much bandwidth (expressed in bits/s) may be allowed to be used, on average. A resource frame is valid until the next resource frame has been received by an application 4 to 6. This is, therefore, a relatively slow form of resource management.

As is the case with the applications resource, utilization of the radio resource by the mobile multimedia terminal 1 is controlled by the radio modem 8 being allotted resource frames. The resource frames contain, per application, the maximum allowable bandwidth (expressed in bits/s) which may be used, and how much bandwidth (expressed in bits/s) may be allowed to be used, on average. Furthermore, the resource frames will contain information concerning the quality requirements of respective applications. Quality requirements can be expressed in terms of output power and protection coding (i.e. error correction coding) in the functional unit 9, which influence the utilization of bandwidth on the radio route. A resource frame is valid until the next resource frame has been received by the radio modem 8. This is, therefore, a relatively slow form of resource management.

Control of the applications resource 4 to 6 and the radio modem 8, in a manner as outlined above, will not result in an efficient dynamic utilization of the radio medium (i.e. a rapid adaption of the radio modem 8 to variations in incoming data flow) generated by the multimedia applications 4 to 6. Thus, in order to be able to utilize the radio resource in an efficient manner, the radio modem 8 must be adapted to respond to variations in incoming data flow. In order to construct a system in which the multimedia applications 4 to 6 are adapted to signal to the radio data modem 8 that:

the generated data flow has changed; and the change in the generated data flow should be taken care of by the function 9, before the data flow has reached the radio modem 8.

Since it is not practicable for the data modem 8 to rapidly adapt to variations in incoming data flow, for the reasons outlined above, this problem can be overcome according to the present invention by utilizing an access method which supports statistical multiplexing on the radio route. Such an arrangement can be constructed which does no use more bandwidth on the radio route, than that which is momentarily needed. In order to realize this arrangement, it is necessary to provide an access method that enables different users to share the same physical resource which, for instance, can be expressed in terms of frequency and time slots. In accordance with the present invention, an access method is used which is based on code division, where different users are separated by means of unique codes but can use the same frequencies and time slots. Examples of such access methods are COFDM (Coded Orthogonal Frequency Division Multiplex) and CDMA (Code Division Multiple Access).

COFDM is a variant of OFDM (Orthogonal Frequency Division Multiplex) and uses Fast Fourier Transform (FFT) processing and convolution error coding at the modulator stage. When this is combined with complementary FFT processing and Viterbi decoding at the demodulator, the overall bit error rate is very low. Since the COFDM spectrum has noise-like properties and the signal can be transmitted at relatively low power, it produces very little adjacent channel interference.

CDMA is a method well suited to digital transmission in which all users operate at the same frequency and simultaneously use the whole channel bandwidth. This in turn leads to an improvement in the spectrum utilization. A unique digital code is added to each digital transmission sequence and the intended receiver station is equipped with the same key. By using correlation detection, the receiver extracts the wanted signal from the noise of all the other transmitters.

It will be seen from the foregoing description that the present invention can, in essence, be divided into three parts, namely:

a structure which constitutes the basis for how a mobile multimedia application can be designed to effect efficient use of a radio resource;

the core of the resource management logic, consisting of the interaction between the service function 3 which has the task to optimise the service on the basis of a service goal and existing, bandwidth, and the access function 7 which has the task to continuously try to offer a connection that has sufficient bandwidth to achieve the service goal; and the management of resources which are divided into two parts, namely:

a comparatively slow management of those resources which control the radio modem 8, via function 9, and the multimedia applications 4 to 6 by the allocation of resource frames; and a rapid management of resources which makes it possible for the radio modem 8 to use, momentarily, the bandwidth which is needed on the radio route, i.e managed by the function 9.

It will be directly evident from the foregoing description that the present invention has been described in terms of a general structure and associated general procedure and that it can, therefore, be used in a large number of applications. In particular, the invention can be used to advantage for multimedia applications which utilize radio communication (i.e the multimedia applications generate a varying flow of information and utilize a variable and restricted channel for data transmission).

What is claimed is:

1. A mobile radio terminal for a digital cellular radio communication system, comprising:

a number of base stations connected to a public network, each of said base stations being adapted to serve a number of mobile radio terminals, characterized in that said mobile radio terminal comprises, negotiation means for initial negotiation with a service provider for providing a service application required by a terminal user, control means for dynamically controlling individual elements of the service application, interactions between said individual elements, and interactions between the service application and a carrier network, and code division access means for enabling different users to share a radio resource;

a radio data modem for transmitting and receiving data for said service application, said data modem including an access function for controlling access to said carrier network;

a mobile user terminal interactively connected to said data modem, wherein said mobile user terminal includes terminal user means for enabling a user to specify and control a required service application;

wherein said negotiation means are adapted to negotiate a service goal with said service provider which satisfies said user requirements;

wherein at least one service function of said mobile user terminal is adapted, on completion of said negotiation, to request said access function to establish a radio data channel connection to said service provider, thereby enabling achievement of said service goal, and wherein said radio data modem is adapted, during provision of the required service, to dynamically coordinate and control the service application by ensuring that said radio data channel continues to enable achievement of said service goal.

2. A mobile radio terminal for a digital cellular radio communication system, comprising:

a number of base stations connected to a public network, each of said base stations being adapted to serve a number of mobile radio terminals, wherein said mobile radio terminal comprises, negotiation means for initial negotiation with a service provider for providing a service application required by a terminal user, control means for dynamically controlling individual elements of the service application, interactions between said individual elements, and interactions between the service application and a carrier network, and code division access means for enabling different users to share a radio resource, a radio data modem for transmitting and receiving information data, said data modem being adapted to utilize a radio resource to accommodate different service applications and including:

an access function for controlling access by said mobile radio terminal to a carrier network;

a data flow control function for said data modem;

a mobile user terminal including, control function for specifying and controlling a service application required by a terminal user;

at least one service function for establishing the service application and negotiating a service goal with a provider of the required service application, which satisfies said user requirements, wherein said at least one service function is adapted, on completion of said negotiation, to request said access function to establish a radio data channel connection to said service provider, which enables achievement of said service goal; and wherein said radio data modem is adapted, during provision of the required service, to dynamically coordinate and control the service application by ensuring that said radio data channel continues to make it possible to achieve said service goal.

3. A radio terminal as claimed in claim 1, wherein the service goal specifies a type and quality of a service available from the service provider.

4. A radio terminal as claimed in claim 1, wherein said service provider includes the at least one service function in a fixed network.

5. A radio terminal as claimed in claim 1, wherein the service provider includes at least one service function belonging to another user of the digital cellular radio communication system.

6. A radio terminal as claimed in claim 1, wherein the achievement of the service goal is determined by a quality of service (QoS) provided by the established radio data channel.

7. A radio terminal as claimed in claim 6, wherein said QoS is determined by demands imposed by the service application.

8. A radio terminal as claimed in claim 6, wherein when a required quality of service (QoS) for achievement of the service goal cannot be satisfied, said data modem is informed of a maximum restricted QoS that can be offered, wherein said mobile user terminal is informed by said data modem of the maximum restricted QoS, and wherein said mobile user terminal, on receipt of information concerning the maximum restricted QoS, is adapted to optimize the service application on the basis of the maximum restricted QoS.

9. A radio terminal as claimed in claim 6, wherein when the data modem receives information concerning an improved QoS, said mobile user terminal is informed of an improved QoS and, on receipt of information concerning the improved QoS, said mobile user terminal optimizes the service application on the basis of the improved QoS.

10. A radio terminal as claimed in claim 1, wherein the negotiation means are adapted to renegotiate the service goal during provision of the service application.

11. A radio terminal as claimed in claim 10, wherein said renegotiation of the service goal results in at least one of longer provision of the service application and increased optimization of the service application.

12. A mobile radio terminal for a digital cellular radio communication system, comprising:
a number of base stations connected to a public network, each of said base stations being adapted to serve a number of mobile radio terminals, characterized in that said mobile radio terminal comprises,
negotiation means for initial negotiation with a service provider for providing a service application required by a terminal user,
control means for dynamically controlling individual elements of the service application, interactions between said individual elements, and interactions between the service application and a carrier network, and
code division access means for enabling different users to share a radio resource,
wherein the service application is a multimedia application,
wherein individual elements of the multimedia application include,
video,
audio, and
data, and
wherein said individual elements of the service application are allotted resource frames containing the maximum allowable bandwidth that may be used for a respective element of the service application, and how much bandwidth may be used, on average, by said respective individual elements of the service application.

13. A radio terminal as claimed in claim 1, wherein said radio data modem is allotted resource frames containing, for individual elements of the service application, the maximum allowable bandwidth that may be used for respective individual elements of the service application, and how much bandwidth may be used, on average, by respective individual elements of the service application.

14. A radio terminal as claimed in claim 12, wherein said resource frames contain at least one quality requirement of respective individual elements of the service application.

15. A radio terminal as claimed in claim 12, wherein each of said resource frames is associated with a multimedia application.

16. A method for efficient use of bandwidth for mobile radio services provided by a digital cellular radio communication system including a number of mobile user terminals, wherein each of said mobile user terminals has a radio data modem for transmitting and receiving information data on a radio channel; a number of base stations connected to a public network, and each of said base stations is adapted to serve a number of mobile terminals, said method including the steps of:
a user of a mobile terminal specifying a required service application;
said mobile terminal initiating establishment of a required service application, on the basis of said user requirements, and negotiating a service goal, which satisfies said user requirements, with a provider of the required service application;
said mobile terminal, on completion of said service goal negotiation, establishing an established radio data channel between a respective radio data modem and a service provider, thereby enabling achievement of said service goal,
wherein said radio modem is adapted to utilize the radio channel to accommodate a plurality of service applications; and
said data modem, during provision of the required service, dynamically coordinates and controls individual elements of the service application by ensuring that said radio data channel continues to enable achievement of said service goal.

17. A method as claimed in claim 16, wherein the service goal specifies a type and quality of service available from the service provider.

18. A method as claimed in claim 16, wherein the service provider includes the service applications in a fixed network.

19. A method as claimed in claim 16, wherein the service provider includes service applications belonging to another user of the digital cellular radio communication system.

20. A method as claimed claim 16, wherein the achievement of the service goal is determined by a QoS provided by the established radio data channel.

21. The method as claimed in claim 20, wherein said QoS is determined by demands imposed by the service application.

22. The method as claimed in claim 20, further including the steps of:
when the required QoS for achievement of the service goal cannot be satisfied, said data modem is informed of the restricted maximum QoS that has been offered;
said mobile terminal is informed by said data modem of the restricted maximum QoS; and
said mobile terminal, on receipt of information concerning the restricted maximum QoS, is adapted to optimize the service application, on the basis of the restricted maximum QoS.

23. The method as claimed in claim 22, wherein said mobile terminal optimizes the service application on the basis of the restricted maximum QoS, said mobile terminal also prioritizes individual elements of the service application, thereby resulting in at least one of a deterioration of quality of at least one of said individual elements, and temporary deactivation of at least one other of said elements.

24. A method as claimed in claim 21, further including the steps of:
when the data modem receives information concerning an improved QoS, said mobile terminal is informed of the improved QoS; and
said mobile terminal, on receipt of the information concerning the improved QoS, optimizes the service application based on the improved QoS.

25. A method as claimed in claim 24, characterized in that optimization of the service application, on the basis of the improved QoS, includes the step of prioritizing individual elements of the service application, said prioritization resulting in the quality of at least one of said elements being improved, and/or activation of at least one other of said elements.

26. A method as claimed in claim 16, further including the step of periodically renegotiating the service goal.

27. A method as claimed in claim 26, characterised in that renegotiation of the service goal results in an extension of the service application.

28. A method as claimed in claim 16, wherein the step of specifying further comprises specifying a multimedia application as the service application.

29. A method as claimed in claim 28, characterised in that the individual elements of the multimedia application are as follows:

video;

audio; and data.

30. A method as claimed in claim 16, further including the step of allotting resource frames to individual elements of the service application, each resource frame containing a maximum allowable bandwidth that may be used for respective individual elements of the service application, and how much bandwidth may be used, on average, by said respective individual elements of the service application.

31. A method as claimed in claim 16, further including the step of allotting resource frames to the radio data modem, wherein for each element of the service application said resource frames contain a maximum allowable bandwidth that may be used for said each element, and how much bandwidth may be used, on average, by said each element.

32. A method as claimed in claim 30, characterized in that said resource frames contain at least one quality requirement of said respective individual elements of the service application.

33. A method as claimed in claim 30, characterized in that each of said resource frames is associated with a multimedia application.

34. A method as claimed in claim 16, characterized in that said method uses code division access to enable sharing of a radio resource by more than one user.

35. A method as claimed in claim 34, characterized in that said method uses CDMA or COFDM.

36. A mobile radio for a digital cellular radio communication system including a number of base stations connected to a public network, each of said base stations being adapted to serve a number of mobile radio terminals, wherein each of said terminals is adapted to effect efficient use of a radio resource and includes a service function for optimizing a service application required by a terminal user on the basis of a service goal and existing bandwidth of a radio data channel; a radio data modem including an access function for dynamically controlling said radio data channel to provide a connection which makes it possible to achieve the service goal, and a data flow function for power control, channel encoding and code division of said radio data channel, said access function interacting with said service function; and resource management means for managing said interaction between said service and access functions.

37. A mobile radio terminal as claimed in claim 36, characterized in that said resource management means includes first management means for controlling of resources used by elements of said service application, said resources being associated with control of the data flow function of said radio data modem, and said service application, and in that said control is effected by allocation of resource frames to said elements of said service application.

38. A mobile radio terminal as claimed in claim 37, characterized in that said resource management means include second management means for controlling of said radio resource, said radio resource being associated with control of the data flow function of said radio data modem to enable momentary use by said radio data modem of the bandwidth needed on said radio data channel, and in that said control is effected by allocation of resource frames to said radio data modem.

\* \* \* \* \*